Figure 1:
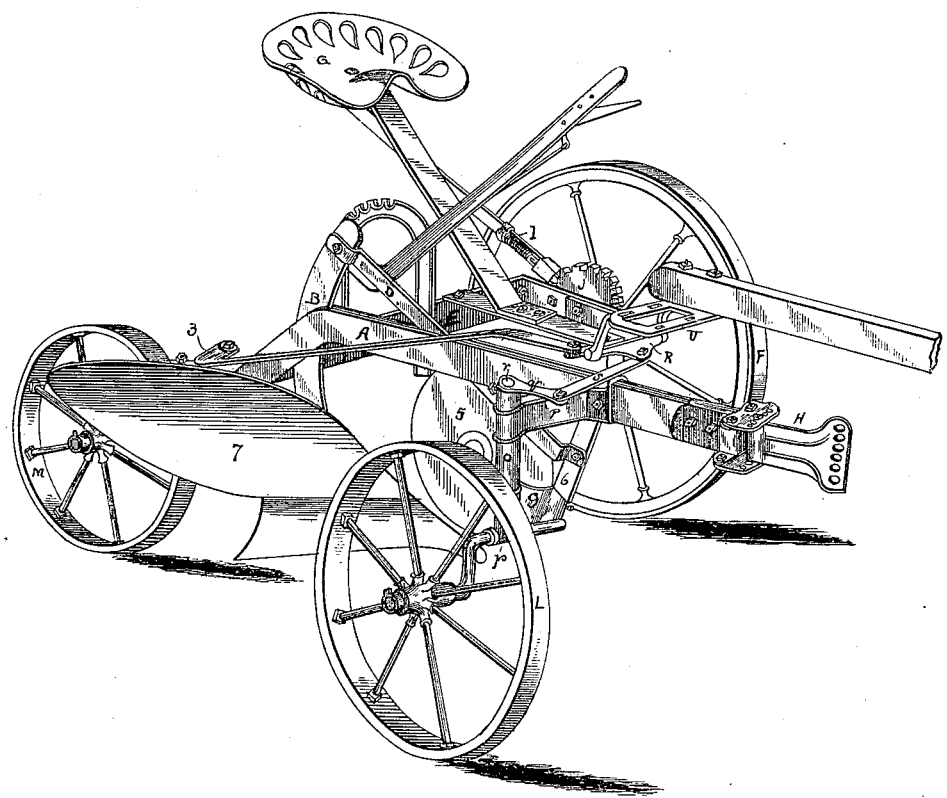

(No Model.)

I. R. GILBERT.

WHEEL PLOW.

No. 353,628.   Patented Nov. 30, 1886.

WITNESSES:
J. B. McGinn.
W. C. Chaffer

INVENTOR.
Isaac R. Gilbert
By his Atty.
R. D. O. Smith

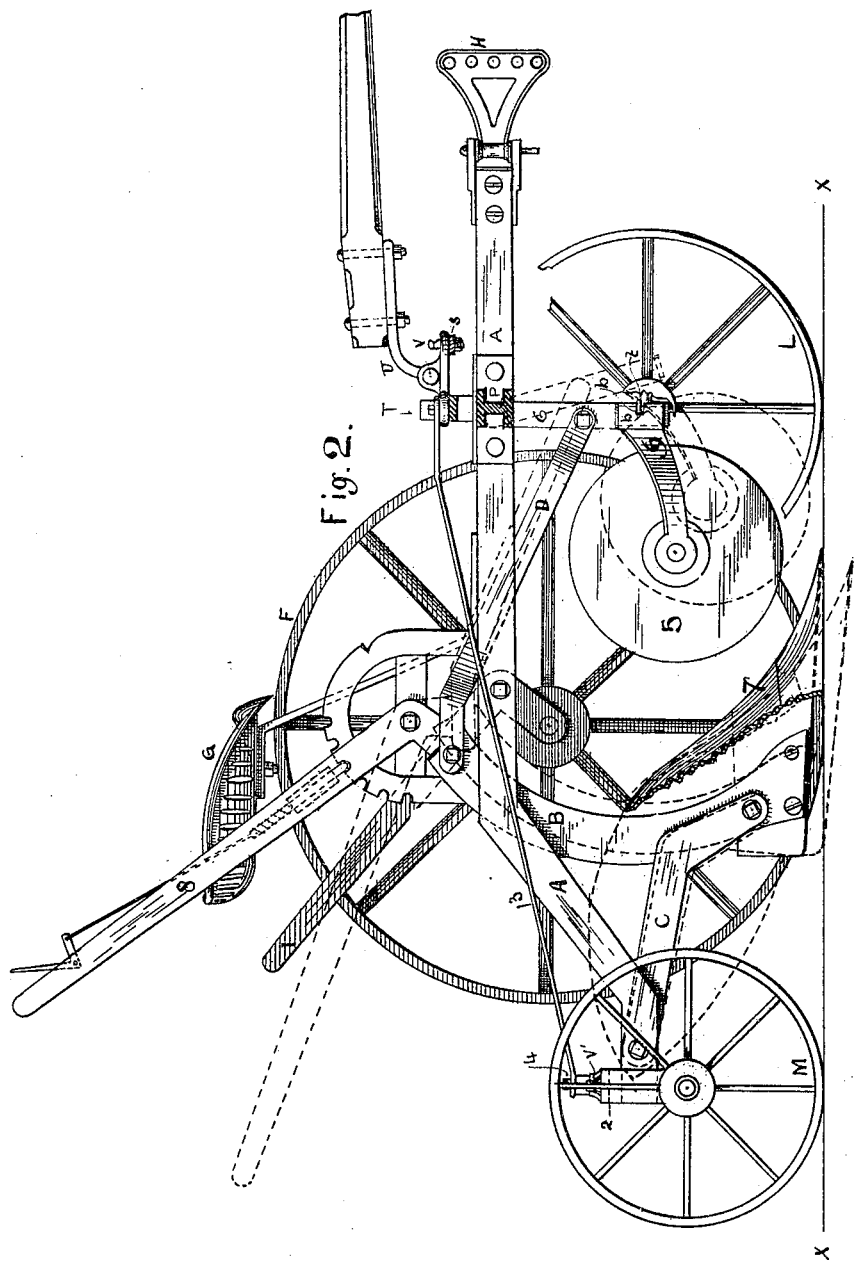

(No Model.) 4 Sheets—Sheet 3.
I. R. GILBERT.
WHEEL PLOW.
No. 353,628. Patented Nov. 30, 1886.
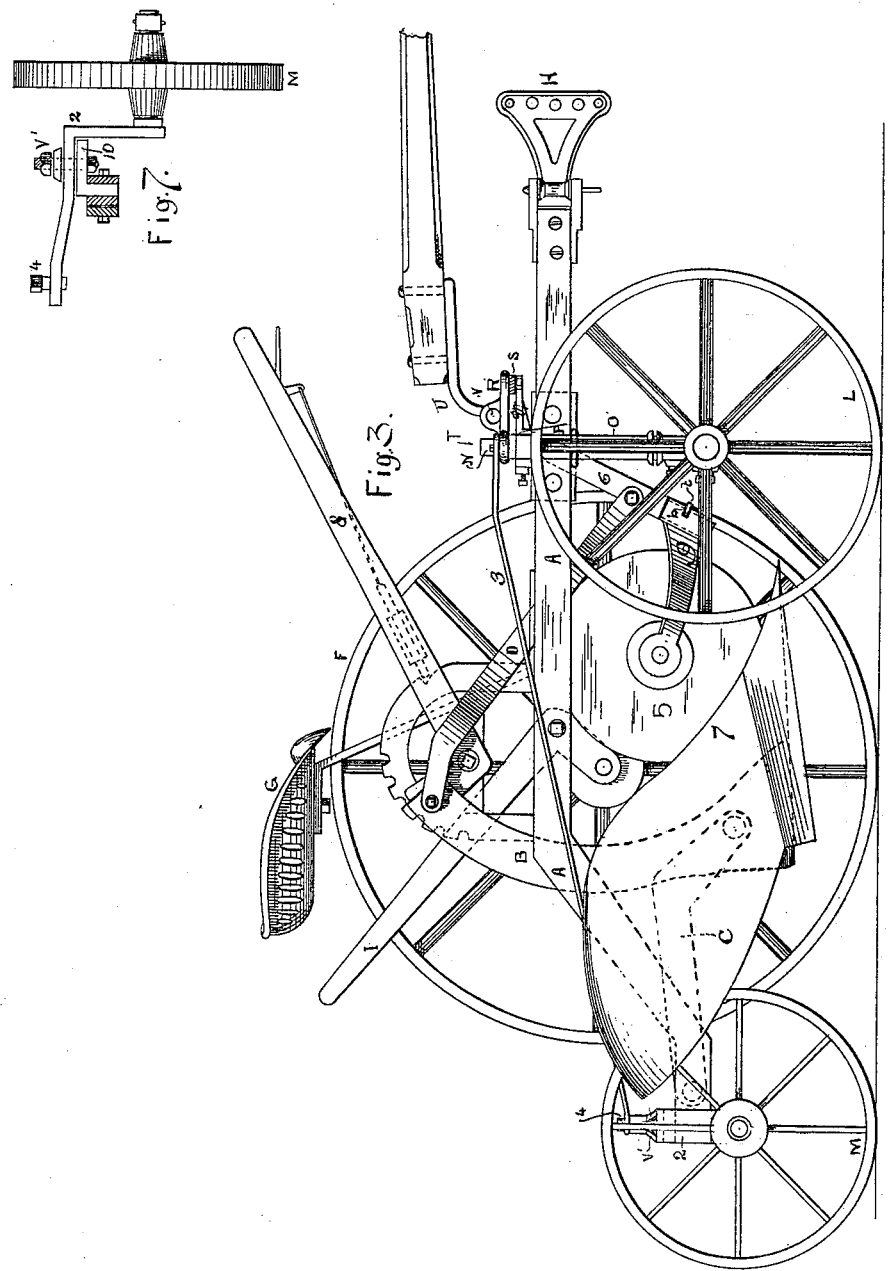
Attest.
A. B. Smith
J. B. McGirr.
Inventor.
Isaac R. Gilbert
By his atty
R. O. Smith

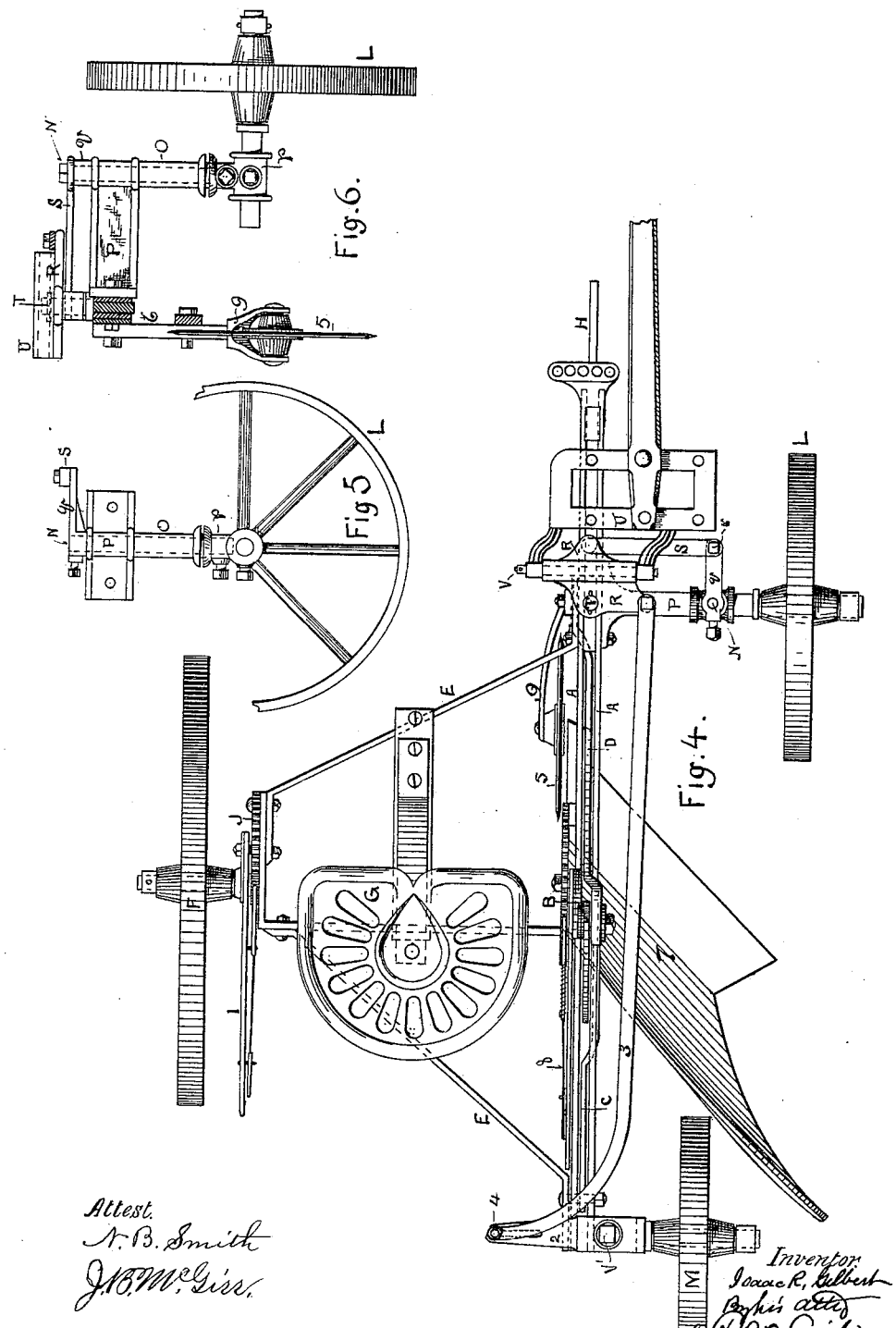

UNITED STATES PATENT OFFICE.

ISAAC R. GILBERT, OF CHARLESTOWN, INDIANA.

WHEEL-PLOW.

SPECIFICATION forming part of Letters Patent No. 353,628, dated November 30, 1886.

Application filed March 9, 1886. Serial No. 194,596. (No model.)

*To all whom it may concern:*

Be it known that I, ISAAC R. GILBERT, of Charlestown, in the county of Clark and State of Indiana, have invented new and useful Improvements in Wheel-Plows; and I do hereby declare that the following is a full and accurate description of the same.

My invention relates to that class of plows known as "three-wheel plows," wherein the plow is attached to a rigid frame carried upon three wheels in contradistinction to the two-wheeled "sulky-plows," wherein the plow is in a measure independent of the sulky-frame and wheels; and its object is, first, to raise and lower the plow by a lever directly pivoted to the standard, whereby the movement will be positively controlled in every direction by said lever; second, to raise and lower the plow with the initial movement slightly in advance at the point, but with the general movement in horizontal parallelism; third, to provide the plow with a thrust-bar behind, said bar being jointed at one end to the frame and at the other end to the heel of the plow to advance the plow, and a lifting-lever fulcrumed on the frame and jointed directly to the plow-standard, whereby the plow, in rising and lowering, moves upon pivot-bearings, instead of sliding in guides; fourth, to provide a three-wheeled plow with its bearing-wheels disposed in a triangular arrangement, the larger wheel being on the land, the second in size in the lead, and the smaller behind, the larger wheel having a fixed but adjustable axle, and the other two being automatically controlled by the tongue; fifth, to provide in a three-wheeled plow a plow capable of being lifted and suspended from the frame, a pivoted colter-standard connected directly with the plow-standard by a connecting-rod, so that said colter will be lifted by said plow-standard irrespective of the plow-lifting lever; sixth, to increase the steadiness and stiffness of the plow by increasing the area of bearing-surface of standard and frame relatively to the width of the bars composing said standard and frame.

Figure 1 is a perspective view of my plow. Fig. 2 is a side elevation, partly in section, plow at work. Fig. 3 is a side elevation, plow elevated. Fig. 4 is a plan view of the plow. Fig. 5 is a side elevation of the leading wheel. Fig. 6 is a front elevation of the leading wheel and the colter. Fig. 7 is a rear view of the wheel M, arm 2.

The longitudinal part of the frame is composed of two parallel bars, A A, of wrought-iron, rigidly secured together, but separated sufficiently far to constitute an open slot, through which the plow-standard may pass freely. This also permits the thrust-bar C and the colter-link D to pass through the frame, the advantage of this arrangement being found in the support which these movable parts receive from contact on both sides with the rigid frame.

On the land side of the machine a laterally-projecting frame, E, is rigidly bolted to the frame A. This laterally-projecting frame E constitutes, with the longitudinal frame A, a substantially equilateral triangular structure, with two of its angles in the line of advance, and at the third angle of this lateral frame the spindle for the land-wheel F is mounted. The driver's seat G is mounted over the middle portion of said frame and opposite the land-wheel. The reason for this arrangement is this: The triangular frame is a very strong frame, and an easy and inexpensive frame to make; but its principal advantage is in locating the land-wheel well in rear of the place of attachment for the team, so that in turning toward the land it will be out of the way of the horse on that side, and in locating the weight of the driver well within the lines connecting the bearing-points of the wheels on the ground, to avoid liability to upset the plow.

At the front end of the frame A the clevis H is attached. At the outer side of the frame the spindle of the land-wheel F is attached to the shorter arm of an angle or bell-crank lever, I, which is pivoted to said frame at its angle, and bears said spindle at or near the extremity of its shorter arm. Said frame is also provided with a notched segment, J, and the lever I is provided with the usual hand-latch to engage said segment and retain the lever in any position desired. The wheel F is much larger in diameter than the leading wheel L or the trailing wheel M. The advantage of this is found in the fact that it encounters a greater inequality of surface and a larger number of obstructions in its path than do the wheels L M, which run in the furrows, and a wheel of large diameter overcomes obstructions in its path more easily than does a small wheel.

The wheel L, though smaller than the wheel F, is as large as it is convenient to use it, because it is desirable to use the largest wheel possible, so as to secure ease of running. It is mounted on a spindle that passes through an inverted-T-pipe, $p$, and is adapted to be turned over when worn flat on the under side, or to be moved in or out to set the wheel L to the different widths of furrow-slice, and is held in place by a set screw. The inverted-T-pipe $p$ is also rigidly attached to the lower end of the vertical shaft N, which is fitted to turn in a pipe-box, O, and said box is attached to the frame A by means of the lateral arm P, so that the wheel L is located just outside the line of cut of the wing of the share, and said wheel therefore runs in the furrow made at the last previous round of the plow.

The upper end of the shaft N is provided with a short forward-projecting arm, $q$, the front end whereof is connected with the bolster R by means of a connecting-rod, S. The bolster R is connected to the frame A by means of a vertical pivot, T, which is rigidly secured to the frame at a suitable place, and the tongue-plate U is jointed to said bolster by a horizontal pivot, V, so that the tongue may rise or fall at its front end or may turn to the right or left horizontally independently of the frame A, and the wheel L will thereby be turned to the right or left, and will preserve its parallelism with the tongue.

The tongue-plate U is provided with a series of holes for the tongue-bolts, and by means of them the tongue may be easily moved to the right or left, as may be desired, when two or more horses are employed.

The trailing wheel M is smaller than either wheel F or L, so that it may be placed close up to the rear of the mold-board. It is mounted upon a spindle provided with a vertical axis, V, on the laterally-projecting bracket 10, bolted to the frame A, and an arm, 2, attached thereto, is extended beyond said axis toward the land side of the machine.

In a three-wheeled plow it is important to have the trailing wheel run as near as practicable to the point of the plow, so as to shorten up the distance between the point of the plow and the bottom of the trailing wheel, so that said wheel may follow the plow closely as it descends into the ground in starting a furrow, and also that the plow may retain a uniform depth in passing over a ridge or crossing a short hollow or trough-shaped place. I also find it important in a three-wheeled plow that the trailing wheel shall run well out in the furrow away from the line of the land side of the furrow to broaden the base of support, so that the bulk of the weight of the furrow-slice may hang upon the plow inside of the plane of the trailing wheel to prevent the plow from turning over when plowing on sloping ground, and also to give increased steadiness to the plow. These results would be opposite if the trailing wheel run near the line of the land side of the plow; and in locating the wheel just where I do in the furrow, behind the plow, with a small wheel, the pivot V may be located out over the furrow, and also far forward, giving to said wheel a larger range of swing, and enabling it in turning a corner of the land to travel a considerable distance without striking the furrow-bank, and on account of the peculiar construction of the devices with which the said wheel is controlled and secured to the frame my wheel never strikes the plow while turning either way; but as soon as the operation of turning is commenced the rim of the wheel begins to move away from the plow on account of its moving in a circle from the pivot V. None of these advantages could be had if I used a caster-wheel such as is used on other plows if they locate their wheel to run where my wheel runs, from the fact that a caster-wheel would be constantly coming in contact with the mold-board of the plow when turning. These same difficulties would be found in a trailing wheel pivoted directly over its rim to the frame if located where my wheel is.

The connecting-rod 3 is jointed at one end to the bolster R at a point between the king-bolt T and the wheel L, and at its other end it is jointed to the arm 2 at a point, 4, to the landside of the pivot V, and therefore a movement of the tongue toward one side deflects the plane of the wheel L in the same direction and the plane of the wheel M in the opposite direction. The deflection of the wheel L in one direction tends to turn the point of the plow in the same direction, and the opposite deflection of the wheel M tends to carry the heel of the plow in the opposite direction, both wheels acting as steerers, and the extent of the deflection of each may be regulated by varying the position of the pivotal points V and 4, so that their joint effect will be to cause the point of the plow to follow the curved line of advance without lateral sway, and permit the plow to turn a short corner without extra strains anywhere.

The plow 7 is of some ordinary pattern, except that the landside is short, terminating at or near the rear edge of the standard, and it is set with its lower edge at the heel higher than the level of the plow-bottom, so that on its lower edge it slopes upward from the point to the heel, and does not run on the bottom of the furrow at all.

The curved standard B extends from the plow upward between the parts of the frame A, so that it is laterally supported by said frame and the plow kept upright on its bottom, notwithstanding the landside does not run on the ground in the usual way. Setting the landside up at its rear end, as I do, does not change the proper direction of the cutting-edge of the plowshare and does not cause the plow to run on its point, as raising the rear end of the plow would do, and thereby destroy the good working qualities of the plow and cause the plow-point to wear out much faster. I also find an advantage in raising the landside at the rear end in setting the plow into the ground quickly when the plow is started, from the fact that the heel of the landside cannot ride on the ground, and only the cutting-edge of the plowshare comes in contact with the ground and cuts its way clear. These advantages are also found in crossing over ridges or rolling places by enabling the plow to keep a more even depth, and disposing of friction at such times. A corresponding advantage is found when the plow is crossing a hollow or trough shaped place. Under all these various conditions the share and mold-board are compelled to stand in their proper positions without being interfered with by the heel of the landside, which would not be the case if the landside were made in the ordinary way. Otherwise I have all the advantages of a landside.

All three-wheeled plows must be turned at the corners with the plow in the ground; but as the colter presents its edge in a vertical line it is unable to move forward in a curved line without increased lateral pressure and friction. To accomplish this with a colter requires either that the colter may be raised from the ground while turning, or that it shall swing freely laterally. I therefore mount the colter 5 swivel-wise upon the arm 6, which is hinged at its upper end to the frame A, and is controlled by the standard B, through the medium of the connecting-rod D, whereby the plow and colter are caused to rise and descend simultaneously and by the same movement of the hand-lever 8.

My colter may be circular and rotating or a straight or curved blade, and to enable it to conform to the line of advance I mount it upon an arm, 9, having a vertical pivot at the lower end of the arm 6, so that it is free to swing like a caster-wheel, and is free also to rise and descend with the plow. The socket portion of the swivel-joint at the front end of the arm 9 is provided with a horizontal slot, and a pin set in the spindle of said joint projects outwardly into said slot, and thereby limits the swing of the colter and also prevents the separation of arms 6 and 9.

The thrust-bar C is jointed at one end to the lower end of the standard B, and at its rear end it is jointed to and between the rear ends of the frame-bars A, being supported and prevented from twisting by the side bars, and in this way assists in holding the plow in an upright position and in line with frame A. The side bars, A, are horizontal from the front end to a point above the heel of the plow, and thence they bend downward nearly to the level of the hub of the trailing wheel M, thence they bend to a horizontal position again, and are rigidly bolted to the laterally-projecting bracket 10, whereon the arm 2 is pivoted. It will be observed that the standard B passes between the side bars, A, at this bend, so that the standard and side bars cross each other diagonally and have a correspondingly-enlarged area of contact and increased steadiness. The same effect is produced with the thrust-bar C, the rear end of which rests between the side bars, A, at their rear ends. Lever 8 is an angle-lever pivoted at its elbow to a rack-bar, H, which is secured to the frame A. Said lever is provided with the usual hand-latch, which engages with the rack and holds the lever in any desired position. The outer end of the short arm of said lever is pivoted directly to the upper end of the standard B. By making this lever an angle-lever and pivoting it, as I do, direct to the standard B, in connection with the thrust-bar C, I obtain a very desirable and positive movement of the plow, which could not be had in any other way. Locating said lever 8, as shown in Fig. 2, with the point of the plow on the same plane of the bottom of the wheels L and M, any movement of the lever forward at once inclines the point of the share upward, and any movement of the lever 8 backward turns the point of the plow downward, and on account of the peculiar movement given to the standard and plow by the lever 8 the heel of the landside moves downward in about the same proportion as the point of the plow with reference to the pivot at the rear end of the thrust-bar C. The advantage of these movements is found in the fact that in any position of the plow and wheels when at work I present the same breast of the plow and mold-board to the soil—that is to say, the same breast or turn of the plow is presented to the soil when the plow is opening the first furrow with plow and the trailing wheel down in the furrow, and the wheel L upon the surface of the ground, that is presented to the work when the wheels L and M and the plow are all down on the same plane in the furrows. Thus it will be seen that to obtain this desirable movement requires the co-operation of an angle-lever, together with the four pivot-points for the other parts—viz., the lever pivoted to the rack, the short arm of the lever pivoted directly to standard B, standard B pivoted to front end of thrust-bar C, and rear end of thrust-bar C pivoted to frame A.

When the lever 8 is moved over forward, the top of the standard B is moved upward and backward in a line curving about the axis of said lever 8, and the plow is by the same movement caused to move upward and forward in a line curving around the rear axis of the thrust-bar C. The composition of these movements causes the point of the plowshare to be raised faster than the heel for a short distance, and a slight upward inclination of the point will cause the plow to run out of the ground, so that it may be removed from the ground with only a slight exertion of force to the lever 8.

The operation of the machine is as follows: Referring to Fig. 1, line $x\,x$ represents the surface of the ground, with the wheel and plow all on the plane of said line. To open out a first furrow, on starting the team the lever 8 is thrown backward to depress the point of the plow. The point then penetrates the soil, and as the plow advances descends to the desired depth, determined by the clevis-hitch, when the line of hitch has been equilibrated by the resistance on the plow. The lever I is also thrown forward to let the frame and plow assume a level position. The wheel M follows the plow down into the furrow and runs upon the bottom thereof; but the wheel L necessarily continues upon the ground-level until the first round has been completed, and upon the second round the wheel L will run in the first furrow and the leveling of the plow will be completed. When the plow has assumed its true position, with wheels L and M in the furrows and wheel F upon the land, the lever 8 will be restored to the position shown in Fig. 2, and thereafter the plow will continue to run on the same plane with wheels L and M. To bring the plow out of the ground, it is required to give to the point an upward inclination while the plow is moving, when it will run out of itself, on account of the cutting-edge of the share being turned in an upward direction. Its upward inclination will increase as it advances. If the lever 8 continues to be pressed forward far enough to latch in the position shown in Fig. 3, the plow will have been elevated clear above the ground for transportation.

I am aware that a wheeled plow has heretofore been made with a thrust-bar pivoted at one end to the frame and at the other end to the plow-standard, so that the power to advance the plow is applied to the plow-standard from behind, and that said plow-standard is at its top connected by a link with a lifting-lever, and is therefore capable of being pulled upward to raise the plow; but in that machine the standard moves upward between stationary guides, while the heel of the plow moves upward in the arc of a circle, and the point of the plow is thereby raised through a larger distance than the heel. I am also aware that the plow has been caused to lift vertically without changing its horizontality; but in that plow the standard slides upward in guides. I am also aware that in a wheeled plow the plow-heel has been pivoted to the rigid frame, and that the standard has been arranged to move backward and forward at its upper end to rock the plow on said pivot, and so raise or lower the point of the plow; but these do not embody the advantages of my invention, because the first and third do not enable the plow to rise and fall without departing from its horizontal position. The second involves so much friction as to render it difficult of operation.

I am aware that a wheeled plow has been made with a supporting-wheel behind the mold-board. Such wheels have generally been trailing caster-wheels, but have sometimes been pivoted and automatically controlled from the tongue. Neither of these embody the advantages of my invention, because a trailing caster-wheel must have its swing-pivot located in or near the plane of the landside and so far to the rear of the mold-board that it may be enabled to swing without contact therewith. The point of support upon the ground during the advance of the plow is therefore in or near the landside, and in working on sloping or side-hill ground such a wheel offers but feeble support to prevent upsetting, and such support is diminished by the freedom of the caster-wheel to swing still farther around under the plow as it upsets. A caster-wheel merely supports and follows. It does not in the slightest degree influence or control the line of advance. The pivoted rear supporting-wheel, controlled automatically by the tongue, is provided with a vertical pivot in the plane of the wheel, and does not swing as it changes the direction of its plane. It presents, therefore, a point of support invariable in position as to the mold-board, and therefore incapable of shortening the arc by change of position on the ground when the plow moves forward in turning. In my invention the mold-board is substantially tangential to a curve, whose center coincides with the axis of the swing-pivot of the rear wheel, and therefore said wheel may be mounted to swing on said pivot and stand close to the rear of the mold-board during changes in the direction of its advance, and when turning toward the mold-board side said wheel advances the point of support upon the ground to materially decrease the radius of the curve. Therefore, so far as I know, no plow has before been made having a rear wheel which either is or can be set so close to the mold-board to reduce the distance from the point of the plow, to follow into the furrow so quickly, to stand so far from the landside to widen the base of support, or to swing on a pivot at a distance from the plane of said wheel; and these are all points of substantial advantage possessed by my machine.

Having described my invention, I claim—

1. In a three-wheeled plow, and in combination with the wheels and frame of the same, a plow, a standard, B, a hand-lever jointed directly to the top of said standard and fulcrumed on the frame, substantially as described, whereby the plow-standard and plow are positively controlled longitudinally and vertically by said lever.

2. In a three-wheeled plow, and in combination with the frame and wheels of the same, a plow, a standard, B, a hand-lever jointed directly to the top of said standard and fulcrumed on the frame at a point in front of said standard, so as to move the same in a line curving backward of said fulcrum, and a thrust-bar jointed at its rear end to the frame and at its front end jointed to the heel of the plow, whereby the up and down movements of the plow are positively controlled by the hand-lever and by the composition of circular arcs, the initial movement of the point slightly in advance of the heel, and the general movement of the plow is in a horizontal position clear of the ground.

3. In combination with the frame of a three-wheeled plow, a plow connected behind with the frame by means of a thrust-bar jointed to said frame at one end and to the plow at the other, a lifting-lever pivoted on the frame and jointed to the plow-standard, and a caster-colter whose standard is jointed to the frame and connected with the lifting-lever by a connecting-rod, substantially as and for the purpose set forth.

4. A plow, and a lifting-lever for the same jointed to the standard, combined with a main frame composed of two parallel side bars bent downward at the place of intersection with the plow-standard, so as to cross said standard obliquely, for the purpose set forth.

5. A wheel-frame made from flat or channel bars parallel and with an intervening space, combined with the plow-standard B and thrust-bar C, located in said intervening space, whereby said standard and thrust-bar are supported laterally in both directions by the bars of the frame itself.

6. The following wheel M, mounted on an arm pivoted midway its length on the bracket 10, which projects from the frame laterally to the middle of the furrow, or thereabout, said arm extending laterally from said pivot to the spindle of said wheel, as and for the purpose set forth.

7. A plow, 7, attached to a wheel-frame, whereon it may be supported for transportation, and bearing-wheels for said frame, two of said wheels being located on the furrow side, one in advance and one in rear of said plow, both mounted on arms pivoted to said frame, combined with a rod, 3, jointed at its rear end to the arm 2 at 4 on the land side of its pivot, and at its front end to the bolster R on the furrow side of its pivot, as and for the purpose set forth.

8. A plow, 7, attached to a wheel-frame whereby it may be supported for transportation, and bearing-wheels for said frame, two of said wheels being located on the furrow side of said frame, the larger one in advance and the smaller one in rear of the plow, both pivoted on laterally-extended arms fastened to said frame, combined with a bolster, R, also pivoted on said frame and connected with swinging arms 2 and $q$ by bars 3 and $s$, as set forth.

9. In a three-wheeled plow, a hollow standard or pipe-box, O, secured to the frame by bracket P, and a shaft, N, to turn therein, provided with a transverse socket-bearing, $p$, at the lower end of said shaft, combined with the spindle for the leading wheel L, adjustably secured in said socket $p$, whereby said spindle may be turned over or laterally adjusted, as set forth.

10. A three-wheeled plow provided with a substantially equilateral triangular frame, one side whereof is substantially in the line of advance, three wheels of different diameters, the larger one being at the angle opposite the furrow side and the smaller one being behind the plow, and said furrow-wheels being wholly controlled by the lateral movements of the tongue.

11. In a three-wheeled plow, a main frame composed, essentially, of parallel bars A A, a caster-colter the standard whereof is pivoted at its upper end to said frame, and a connecting-bar, D, attached at one end to said standard and passing between said bars A A, combined with the hand-lever by which the plow is lifted, whereby the side bars, A A, support said connecting-rod D laterally and prevent lateral sway of the colter-standard.

ISAAC R. GILBERT.

Witnesses:
 JNO. D. SHARP,
 H. A. JOHANBOEKE.